United States Patent
Lindelof et al.

(10) Patent No.: US 8,746,314 B1
(45) Date of Patent: Jun. 10, 2014

(54) PROTECTED PRONG FILE FASTENER AND METHOD OF MANUFACTURE

(75) Inventors: Harold Peter Lindelof, Eden Prairie, MN (US); Marvin J. Halfen, Hastings, MN (US); David J. Gilbertson, Hastings, MN (US); Robert Scudder, Rancho Cucamonga, CA (US); Michael Goodson, Rancho Cucamonga, CA (US); Michael Hacker, Rancho Cucamonga, CA (US)

(73) Assignee: Smead Manufacturing Company, Hasting, MN (US)

( * ) Notice: Subject to any disclaimer, the term of this patent is extended or adjusted under 35 U.S.C. 154(b) by 74 days.

(21) Appl. No.: 13/293,377

(22) Filed: Nov. 10, 2011

Related U.S. Application Data

(60) Provisional application No. 61/412,132, filed on Nov. 10, 2010.

(51) Int. Cl.
*B32B 37/14* (2006.01)
*B29C 63/00* (2006.01)
*B29C 63/42* (2006.01)
*B29C 63/44* (2006.01)

(52) U.S. Cl.
CPC ............ *B29C 63/0069* (2013.01); *B29C 63/42* (2013.01); *B29C 63/44* (2013.01)
USPC .......................................... 156/556; 156/516

(58) Field of Classification Search
CPC .... B29C 63/0069; B29C 63/42; B29C 63/44; H01R 43/00
USPC .............. 156/84, 85, 86, 198, 516, 517, 523, 156/556; 29/33 R, 859
See application file for complete search history.

(56) References Cited

U.S. PATENT DOCUMENTS

| | | | |
|---|---|---|---|
| 3,896,528 A | 7/1975 | Abeles | |
| 4,118,915 A * | 10/1978 | Swenson | 53/291 |
| 4,209,882 A * | 7/1980 | Strickland et al. | 29/33.52 |
| 4,269,530 A | 5/1981 | Weber | |
| 4,417,378 A * | 11/1983 | Brown et al. | 29/33 M |
| 4,418,453 A * | 12/1983 | Brown et al. | 29/33 M |
| 4,437,781 A | 3/1984 | Weihe et al. | |
| 4,519,504 A | 5/1985 | Nausedas | |
| 4,765,121 A * | 8/1988 | Konstantin et al. | 53/442 |
| 4,869,613 A | 9/1989 | Corey | |
| 5,037,228 A | 8/1991 | Karlin | |
| 5,096,323 A | 3/1992 | Walker | |
| 5,213,429 A | 5/1993 | Johnson | |
| 5,236,226 A | 8/1993 | Sheffield | |
| 5,257,870 A | 11/1993 | Bennett et al. | |
| 5,593,242 A | 1/1997 | Mathias | |
| 5,785,444 A | 7/1998 | Matsuura | |
| 5,862,579 A | 1/1999 | Blumberg | |
| 6,168,337 B1 | 1/2001 | Adams | |
| 6,565,277 B1 | 5/2003 | Huang | |

* cited by examiner

*Primary Examiner* — Katarzyna Wyrozebski Lee
*Assistant Examiner* — John Blades
(74) *Attorney, Agent, or Firm* — Altera Law Group, LLC

(57) ABSTRACT

A prong style file fastener and the method of manufacture is disclosed which has a protective element to prevent damage to paper documents and personal injury. In one embodiment, the prongs of the fastener are covered with a heat shrinkable sheath. In another, the prongs are overcoated with a powder coating which is melted thereon. A method of applying the sheath to the prongs uses a pair of jaws or V-shaped surface to drive the sheath onto the prongs.

8 Claims, 14 Drawing Sheets

PROTECTED PRONG FILE FASTENER AND METHOD OF MANUFACTURE

BACKGROUND FIELD OF THE DISCLOSURE

The present invention is directed to the field of paper document management, and more particularly to file fasteners having bendable prongs.

DESCRIPTION OF THE RELATED ART

Paper fasteners have been used for decades to bind paper documents into file folders. They are typically formed from a base plate with two orthogonal prongs extending from the ends of the base plate and which are themselves bendable.

In the most prevalent configuration, the fastener also includes a compressor plate which is used at the end of the prongs to provide a secure lock on the prongs.

These prior art devices have at least two serious deficiencies. First, they have sharp metal edges which shear the papers they are intended to bind and second, these same sharp edges can cause injuries.

A solution to these problems would be to dull or roll (coin) the edges. This does not seem to work at least with respect to the first problem. The mere nature of metal edges, dull or not, causes papers to become detached by ripping or shearing. Use of plastic prongs has likewise not worked well. The plastic is either too elastic or too rigid which causes cracks and failures.

The present invention provides multiple solutions to this dilemma.

BRIEF SUMMARY

A protected pronged file fastener is disclosed having a longitudinal base element having first and second ends, a pair of prongs each extending from each end of the base element, said prongs being bendably attached thereto, and a non-metallic sheath overcoating covering a substantial portion of each prong.

The fastener may also have a sheath of flexible tubular member heat shrunk on the prongs.

The fastener may also have prongs and tips, the prongs being tapered from the tip to a point between the tip and the end connected to the base.

The fastener may also have prongs that include a tip and are tapered from the tip to the base.

There is also a method of making a protected file fastener having a pair of prongs having proximal and distal ends, comprising any of the steps of inserting a length of heat shrinkable tubing on the proximal end of the prong, engaging the tubing with a pair of jaws and driving the tubing on to the prong until an end thereof reaches the distal end of the prong, applying heat to the tubing.

Also disclosed is a method of making a protected pronged file fastener having a longitudinal base element having a pairs of first and second opposing prongs extending outwardly from said base to a distal end with any or all of the steps of:
  a. cutting a portion of shrinkable tubing to a length preferably less than or equal to the length of said prong;
  b. sliding the tubing onto the prong with the distal end of the tubing and distal end of the prong being proximate;
  c. engaging the distal end of the tubing between a pair of grippers
  d. driving the grippers toward the base element, so that the tubing is maximally driven on to the prong
  e. shrinking the tubing to shrink it around the prong and fix it thereon.

A further method is disclosed of making a protected pronged file fastener having a longitudinal base element having a pairs of first and second opposing prongs extending outwardly from said base to a distal end having any or all of the steps of:
  a. Forming a taper in the prong from the proximal end adjacent the base element to the distal end so that it is narrower at the distal end than the proximal end
  b. Sliding a predetermined length of shrinkable tubing to a length less than or equal to the length of said prong;
  c. sliding the tubing onto the prong with the distal end of the tubing and distal end of the prong being proximate;
  d. gripping the distal end of the tubing
  e. while still engaged, driving the tubing toward the base element, so that the tubing is maximally driven on to the prong
  f. shrinking the tubing around the prong and fix it thereon.

Also disclosed is an apparatus for applying a shrinkable tube to a plurality of spaced apart prong elements, having at least some of these elements:
  a. first and second opposing jaw members having inner opposing faces each having gripping portions thereon
  b. at least one of said members having a pivot spaced from said gripping portion to;
  c. a link pivotally connected to said pivot;
  d. a reciprocating driver for imparting movement into gripping portion via said link to bring said jaw members together with the tube therebetween;
  e. a lateral driver actuated when said jaw members have engaged said tube, to drive the tube along the prong.

The link may be a chain link pivotally connected at one end to the reciprocating driver and at the other to the pivot.

The lateral driver may be connected to a mount upon which also includes the link and jaws, so that when the lateral driver moves, the link and jaw are likewise moved.

The lateral driver may be connected by a three point link connecting the driver, the chain link and the jaw.

The apparatus may further include a pair of pinch rollers sized to snuggly receive a length of said tubing and drive it on to the prong.

The pinch rollers may include a pair of rollers contacting on their peripheral edge and wherein their peripheral edge includes a recess to receive said tubing.

The disclosure further includes an apparatus for applying a shrinkable tube to a plurality of spaced apart prong elements having distal ends, having one or more of the following elements:
  a. A reciprocating driver having distal ends and being mounted spaced from the distal end of the prong;
  b. Pusher end extending from the distal end of the driver said pusher end having a distal facing including a depression having a low point and a sloped sidewalls extending therefrom; said low point of the depression sized to receive the distal end of the prong and the sidewalls sloped to engage the tube at the same time; so that when the driver is driven toward the prong, the tube is driver further onto prong.

The distal face may have a v-shaped surface.

There is also a protected pronged file fastener having a longitudinal base element having first and second ends; a pair of prongs one each extending from each end of the base element, said prongs being bendably attached thereto, and a non-metallic sheath powder coating melted on a substantial portion of each prong.

The summary provided is intended to help the reader understand some aspects of the invention. The scope of the invention is defined by the claims as read with the specification and cannot be determined by this summary.

DETAILED DESCRIPTION OF THE INVENTION

Pronged fasteners are used primarily to attach documents into folders. They provide the advantage over ringed binders in that they are very compact and can adapt to varying thicknesses of documents and remain compact.

An early example of such a binder is found in U.S. Pat. No. 1,978,569 to Dayton dating back to 1934. For 75+ years, this has remained the dominate form of prong binder such as shown in the commercial product. Modifications of the concept such as U.S. Pat. No. 2,477,417 to Pitt worked with the compressor concept but the basic metal base two prong bendable binder is still the standard of the industry today. Even in 1992, patents were being granted on variations of the same product which suffers from the same defects as the original product (see U.S. Pat. No. 096,323 to Walker).

All of the prior devices suffer from two severe defects. First, they have sharp metal edges which shear the papers they are intended to bind and second, these same sharp edges can cause injuries. Thus, there has been a long felt need to solve both of these problems in an economical way, without losing the functionality of the prior art devices. Despite decades of attempts to develop a suitable alternative which was economically feasible, until now, the solution has eluded the efforts of others.

The present invention solves both of the above mentioned problems as well as an additional problem (metal fatigue from repeated bending of metal tangs), while maintaining a cost effective solution.

In one embodiment as shown in FIGS. 1, 2, 3A, 3B, 4, 5, 6 and 7, a two prong binder 10 is shown. The version shown is a "bonded" type, meaning it is self-contained and can be affixed to a file folder without punching the folder. The bonding feature is known in the art such as in Smead® Manufacturing Company product part number 24600. It is also possible to use the inventive features herein with other mechanisms for attachment to files, but as punching holes for the prongs to pass and riveting the base. (Smead® product 35511 or 11537, all of the named product being hereby incorporated by reference.)

Figure 7:
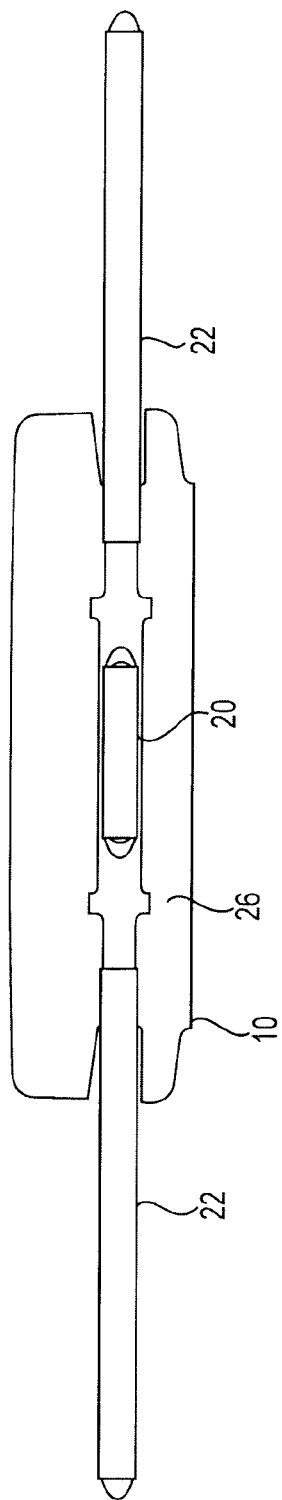
FIG. 7 is top plan view of the system in FIG. 4.

As seen most clearly in FIG. 7, binder 10 has a longitudinal base section 20, with bendable prongs 22 extending from both ends thereof. In this embodiment, the base is affixed to an fixation base 26 of fiber material which itself is then bonded to a file folder or the like, by adhesive.

Figure 1:
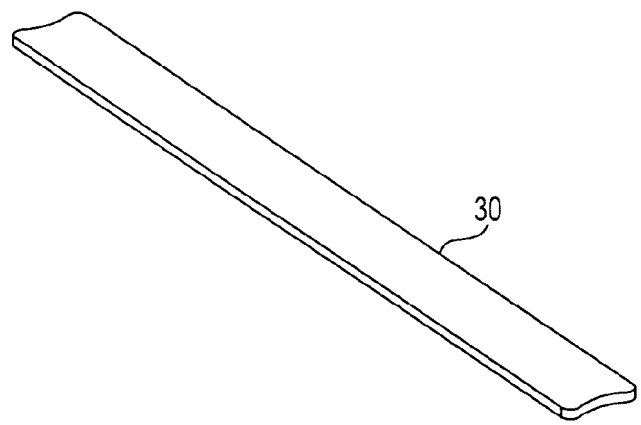
FIG. 1 illustrates a perspective view of a sheath.
Figure 2:
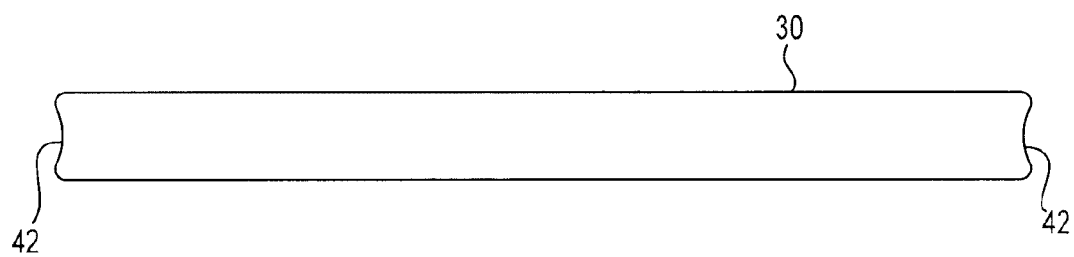
FIG. 2 is a plan view of the sheath in FIG. 1.
Figure 3A:
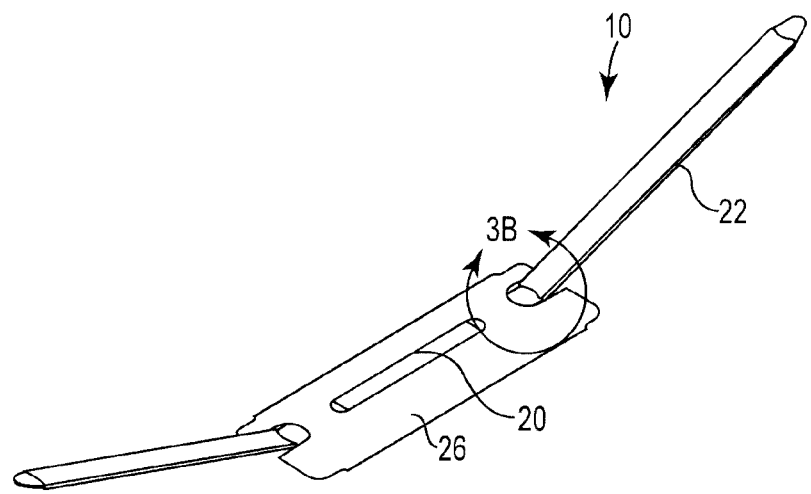
FIG. 3A is a perspective view of a prong clasp system according to one embodiment.
Figure 3B:
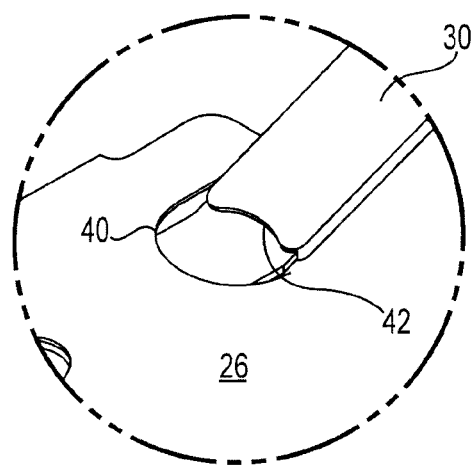
FIG. 3B is a close up fragmentary view of a portion of FIG. 3A.
Figure 4:
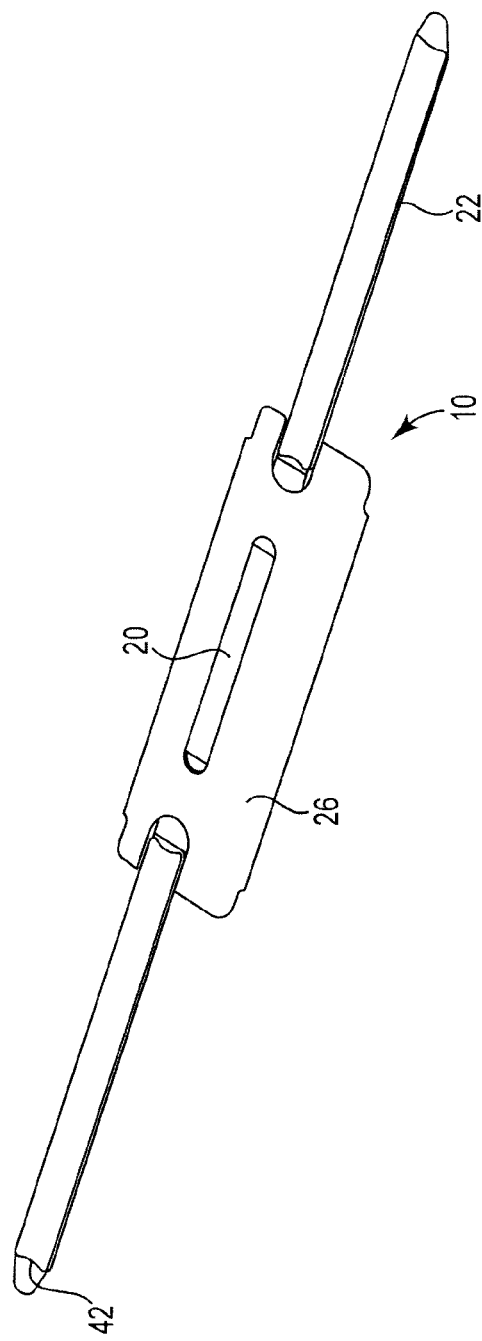
FIG. 4 is a perspective view of a clasp system.

In this embodiment, the tang 22 is overcoated by a flexible material 30 which is shown alone in FIGS. 1 and 2. The preferred material is a heated shrinkable tubing of a type known in the art for electrical insulating applications such as 3M part IMCSN medium wall heat shrink tubing or similar products from Thermafix® product sold at www.shrinkshop.com. Such product typically have a 2:1 heat shrink ratio though other ratios may be acceptable.

Heat shrink tubing does not come flat as shown, but is supplied in a tubular format typically on long spools. The product is semi-rigid but not so rigid that it is easily inserted onto prong/tang 22 of the clasps 10. The method of manufacture which also forms a portion of this invention is detailed below.

To achieve the goals, of 1) safety against injury by laceration, 2) avoiding shearing of documents at their punch holes 3) metal fatigue caused by multiple bends to the metal tang and 4) creating wavy tangs from multiple bends in different places along its length as the document stack changes, by overcoating the tang with flexible non-shearing/cutting material, each of these problems is eliminated.

In particular, the tang 22 is fitted with a heat shrinkable sheath portion 30 which is then shrunk to engage the tang such that it cannot be removed. At the same time, the sheath protects both the user and the paper from cuts by occluding the sharp edges of the tang. Likewise, the bending radius of the tang is now reduced by virtue of the triple layered constructions (metal bounded by two layers of sheath). This prevents the tangs from kinking (becoming wavy and difficult for punched document papers to be inserted) and breaking from over bending. The increased bending radius is particularly helpful in avoiding damage to punched holes as there are no sharp bends in the tang at the point of contact with the paper at its weakest point (holes).

The prior art construction of the tang is not preferred for this new system. In the prior art, the tang has parallel sidewalls to its tip. In the preferred embodiment, the sidewalls 22a-b (see FIG. 6) are tapered so that they can accommodate insertion of the sheath 30 without snagging. This becomes important in high speed manufacturing because the sheath is not highly rigid, and if of low quality will not be perfectly cylindrical.

Figure 5:
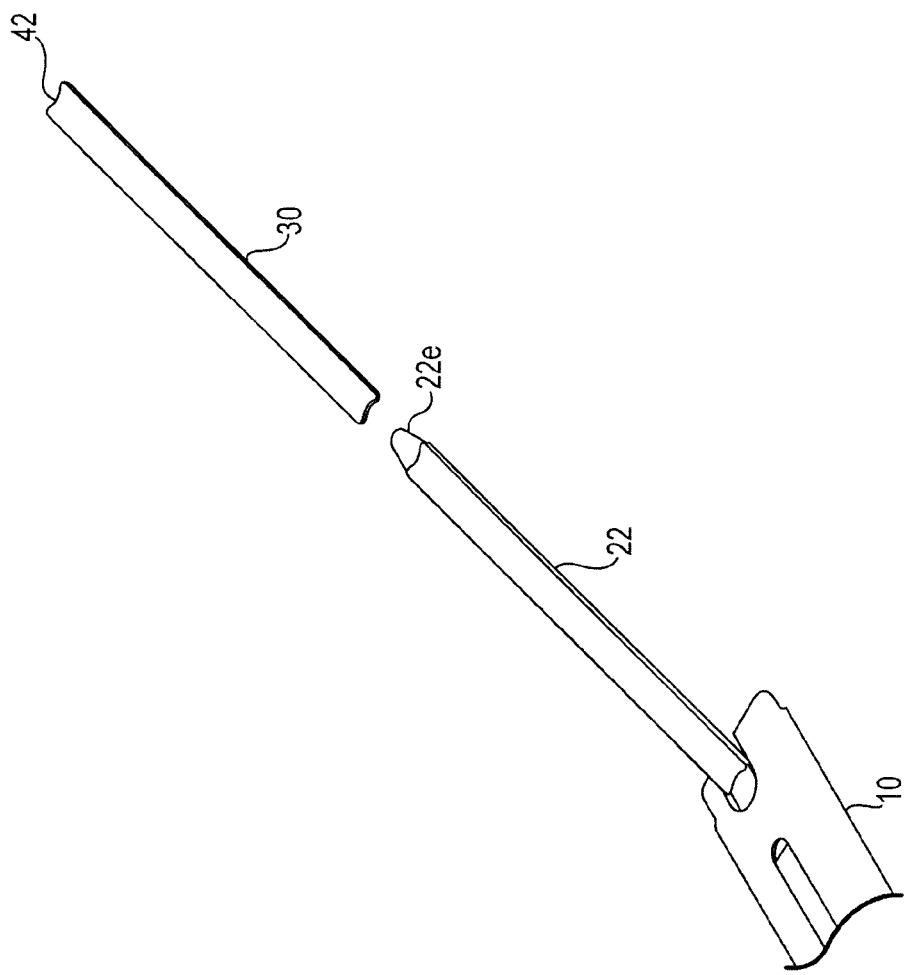
FIG. 5 is a fragmentary view of FIG. 4 with the sheath shown inserted and before insertion with a broad tip.
Figure 6:
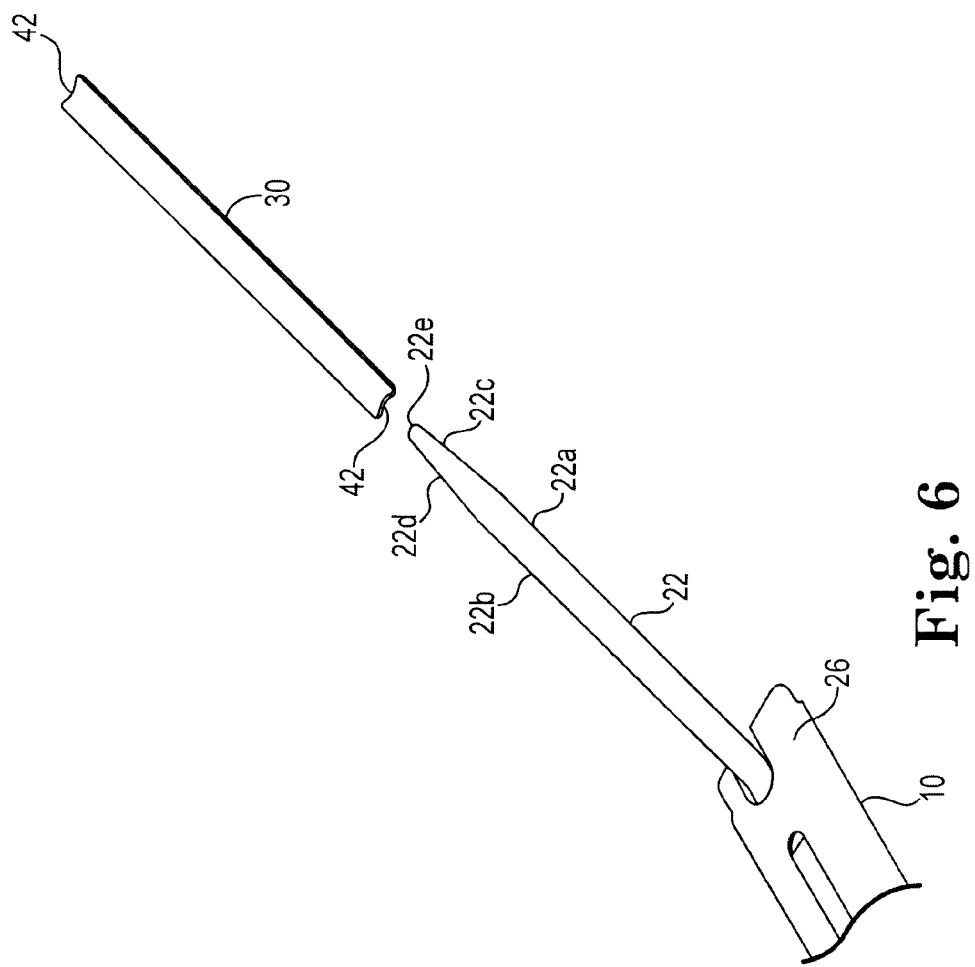
FIG. 6 is a view like FIG. 5 with the sheath before insertion with a narrow tip.

The tip in FIG. 5 is tapered, but in FIG. 6. is highly tapered for the same reasons as the body 22a-b is tapered. The taper 22c-d is more highly taped than the body 22a-b. This allows for easy insertion of the sheath, but does not result in an overly thin tang body which would degrade performance.

The preferred terminations for the sheath 30 are as follows For the tip/distal end, the heat shrinkable sheath should terminate at a point on the top 22e where the total width (underlying base material+thickness of the sheath) is at least 10% less than the maximum width of the tang overcoated with heat shrinkable sheath/tubing. Alternatives would be 15%, 20%, 25% or more. The goal is to avoid snagging of the tip. By increasing the taper, the overcoating is less likely to snag. If the sheath 30 extends into the hole, the snagging risk is virtually eliminated.

At the proximal end the overcoating should preferably extend to contact or at least be adjacent to the base material 26 so that papers will not snag on their removal. The preferred extent would be close enough to the base that no single leaf of paper can fit therebetween.

When the heat shrinkable tubing is cut from a continuous spool, it can be simply cut orthogonally, or with a slight concavity 42. This can provide further resistance to snagging especially at the tip because the cut away portion (concavity) might otherwise cause slight bunching when shrinking.

Figure 8:
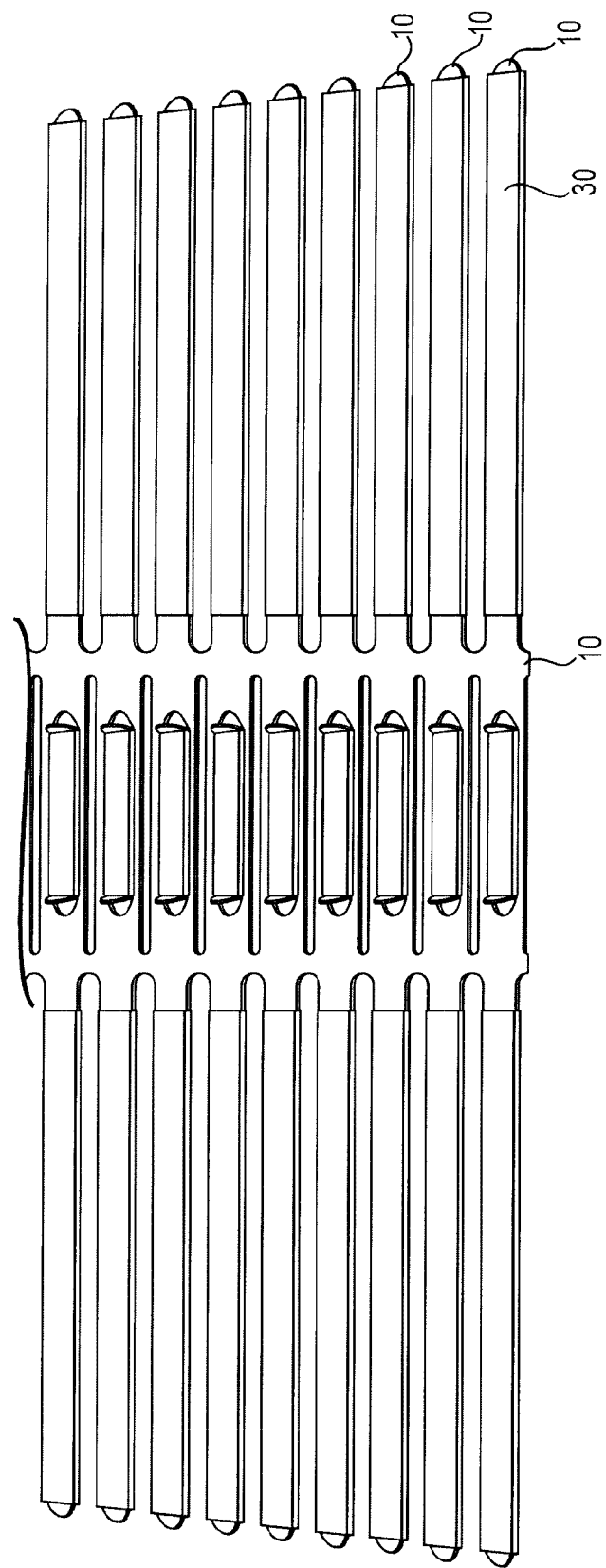
FIG. 8 is a perspective view of a plurality of prong clasps before cutting into separate clasps.

FIG. 8 illustrates a plurality of clasps 10 connected in a serial strip as produced by a punching machine. It is preferable to produce claps 10 in a continuous strip in order that they can be fitted with a sheath by automated machines.

FIGS. 9, 10, 11, 12, 13 and 14 show production machines for assembly of sheath covering onto tangs 22.

There are multiple complications with the manufacture of sheath protected tangs. First, is the fact that the sheath material must be relatively thin to allow the increased width of the tang which the sheath creates and the fixed size of the standard hole punch. The international standard hole diameter is 5.5-6.5 mm (¼ inch) spaced 70 mm apart.

Figure 11:
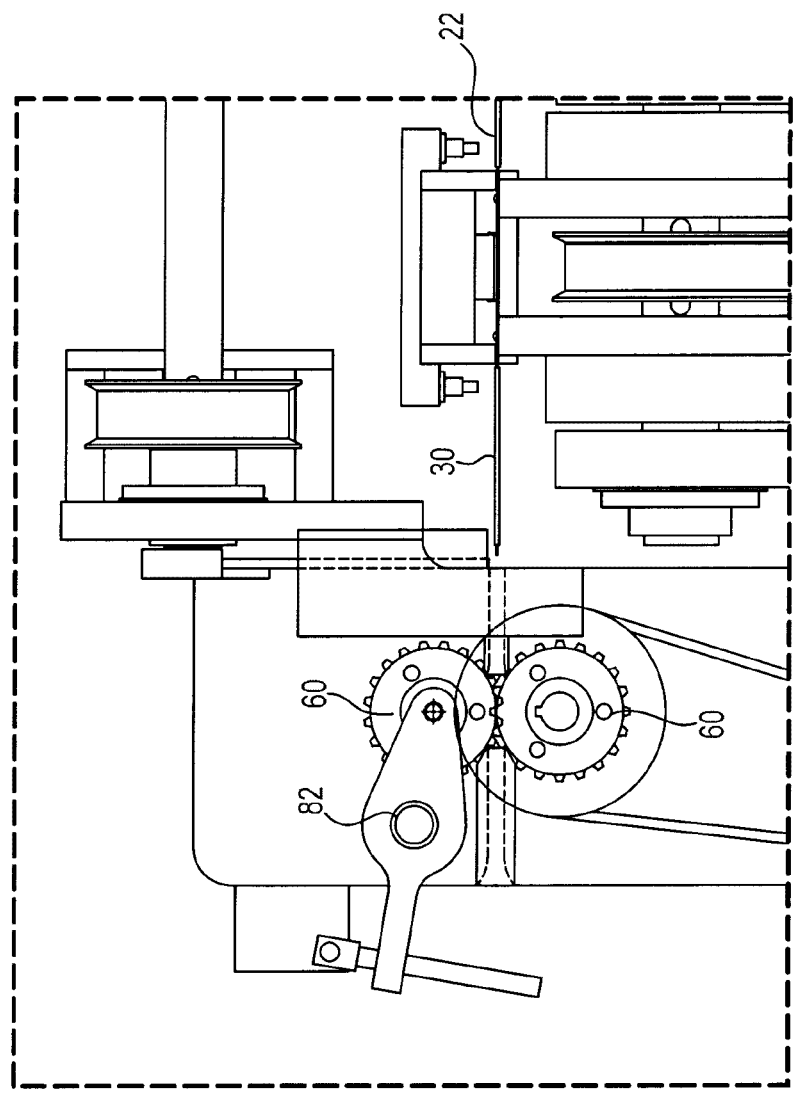
FIG. 11 is a side plan view of the machine in FIG. 9.
Figure 12:
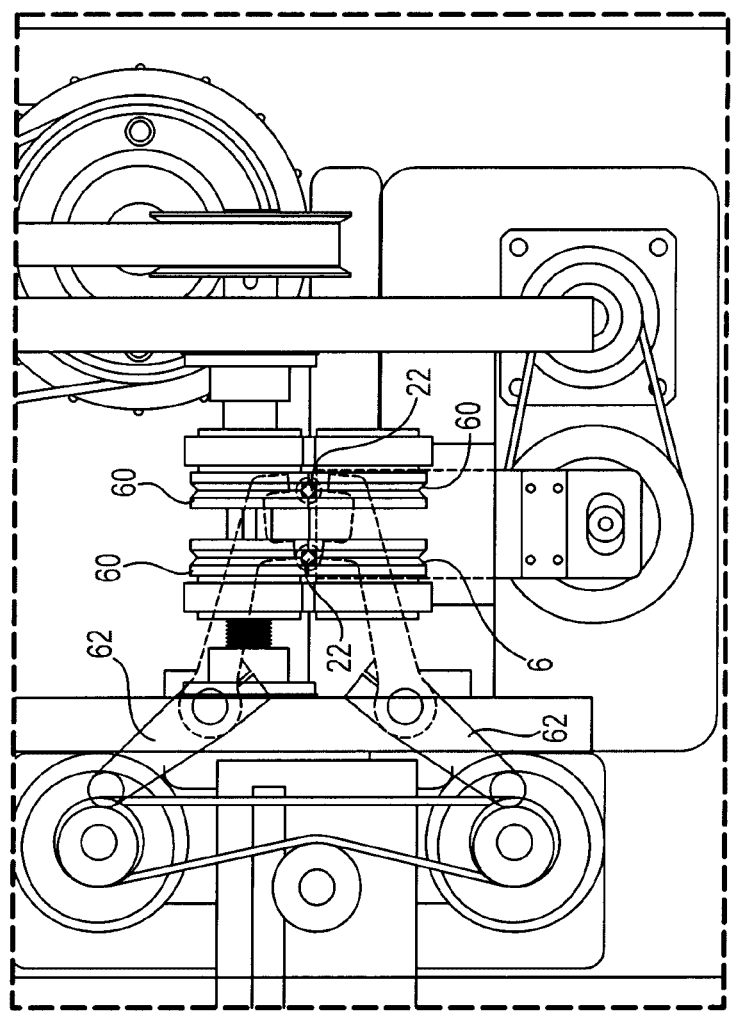
FIG. 12 is a top plan view of FIG. 11.
Figure 13:
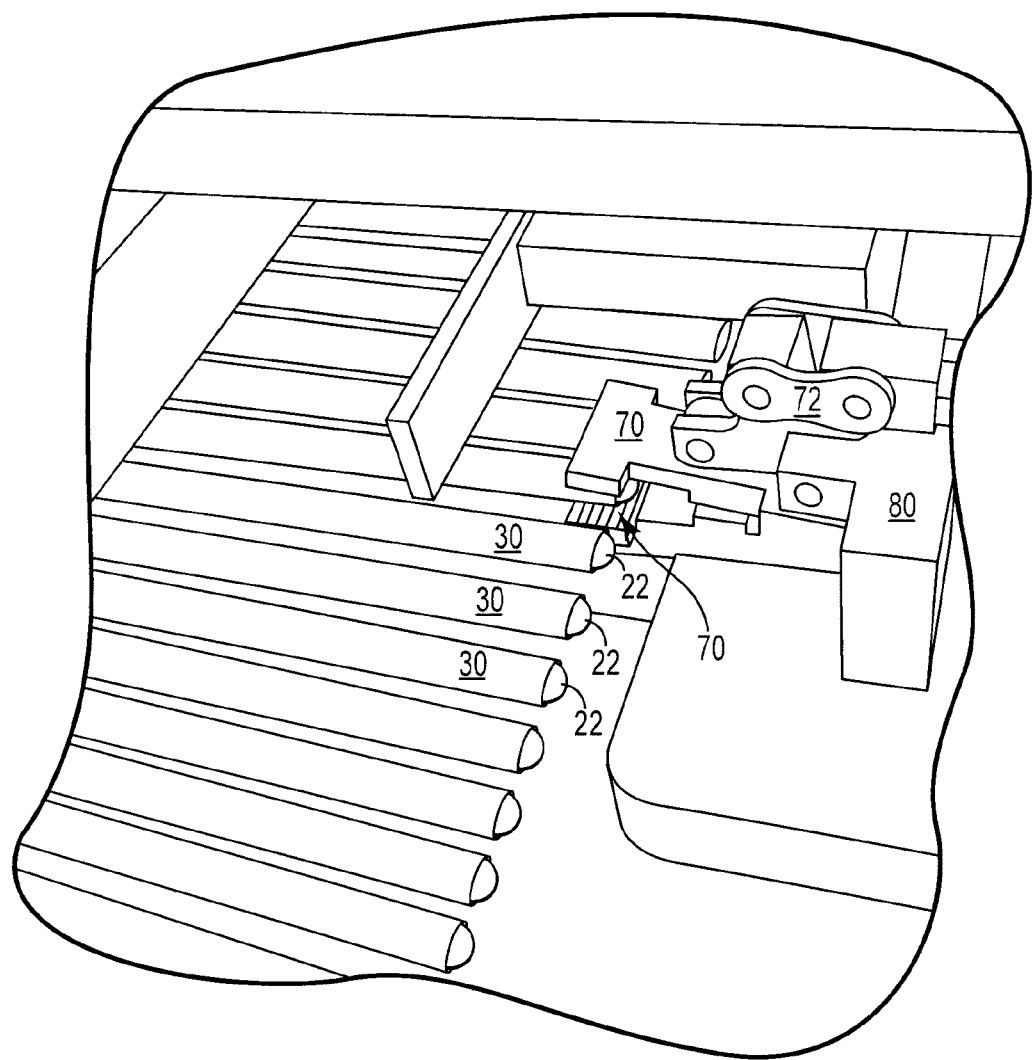
FIG. 13 is a perspective view of the machine in FIG. 9.

FIG. 11 illustrates a plurality of tangs 22 seen in side view. A pair of mating pinch rollers 60 (see FIG. 12) with V-shaped or concave recesses to capture and feed the shrink tubing off a spool. In FIG. 12 two sets of paired feed rollers 60 are shown so that two tangs can be fitted with sheath simultaneously. Reciprocating arms 62 operating off a cam, move into and out of position as the cam rotates and transmits reciprocating motion thru link 72 (FIG. 13). These arms include jaws 70 (see FIG. 13) which are intended to engage the loosely fitting sheath 30 on the tang 22, grab the sheath and drive it inwardly onto the tang to the fullest extent possible without buckling. Therefore, the jaws 70 follow a closing motion where they come together and then an inwardly pushing motion by moving the mount 80 (or other connected portion) inwardly in a reciprocating action. A pivot 82 (FIG. 11) reciprocally releases the pinch rollers 60 after initial insertion onto the tangs 22, whereupon the jaws 70 finish the job of driving the sheath fully onto the tangs.

It is important that the jaw grip sufficiently engages the sheath (hence teeth) but not enough to close the opening in the sheath to inhibit insertion. In fact, the jaws change the shape of the tubing from having a round opening to oblong which is advantageous for finishing the insertion. If necessarily, it would be possible to provide a highly focused air jet into the mount (proximal opening) of the sheath as it approaches the tang to cause slight expansion thereof.

Figure 14:
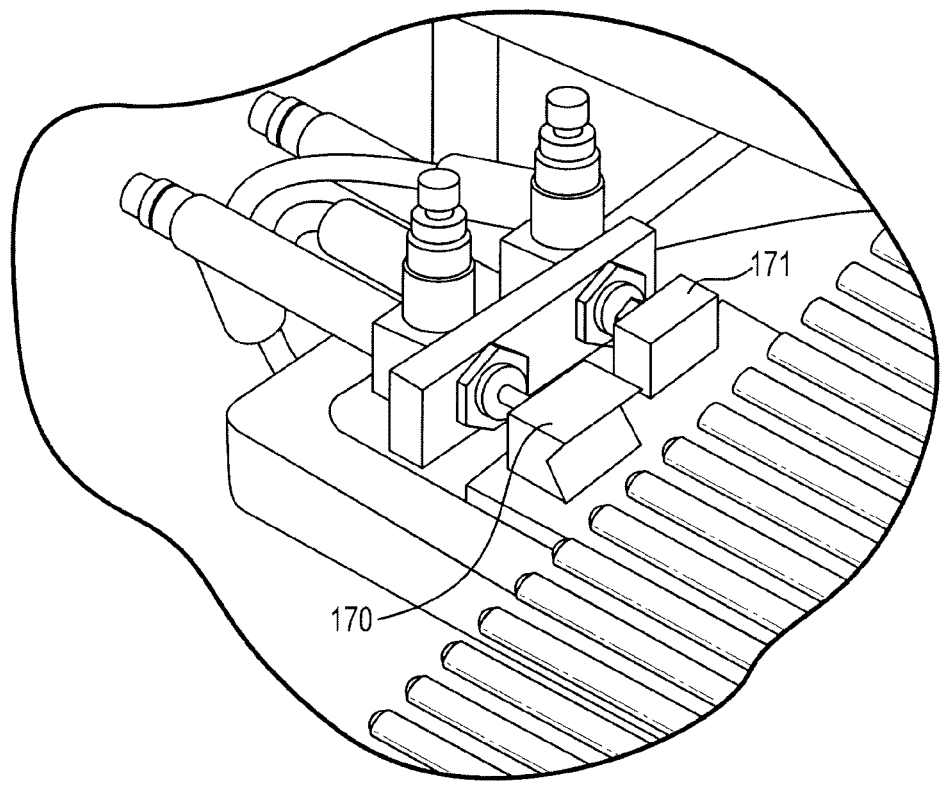
FIG. 14 is a perspective view of an alternate embodiment of the machine in FIG. 13.

There is an alternative way to drive the sheath onto the tangs as shown in FIG. 14. In this embodiment, instead of jaws 70, V-shaped pushers 170 are provided. In this embodiment insertion is a two-step motion. Pusher 171 has a blunt end and drives the sheath onto the tang. Completing the insertion requires a V-shaped or convex shaped head which can push the sheath further onto the tang. The V-shape engages the sheath but not the tang.

Figure 10:
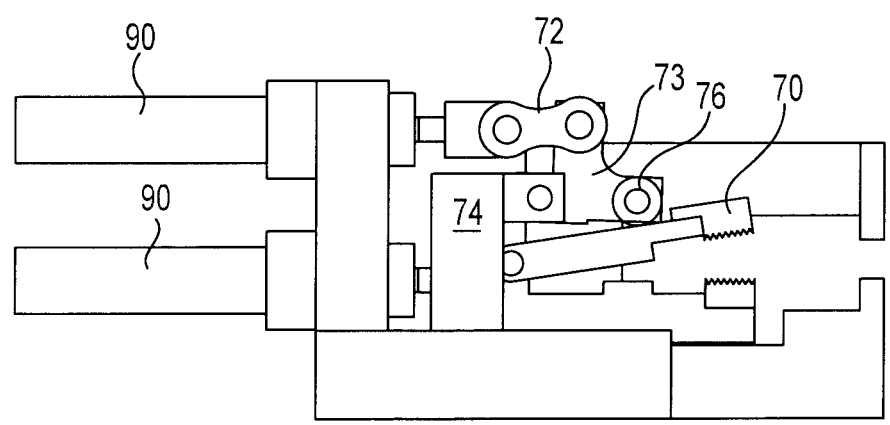
FIG. 10 is a side plan view of FIG. 9.

FIG. 10 shows the mechanics of the reciprocating motion of the jaws 70 with gripping portions, preferably serrations or parallel grooves. Pneumatic cylinders 90 provide a lateral drive force on the (chain) link 72 which is pivotally connected to a to at least one jaw, preferably by a three point link 73 which in turn is connected to a fixed body 74 with a pivot point and a pivot point on 76 on the jaws 70. Pivot 76 can be eliminated in favor of direct pushing engagement between the jaw arm and the three point pivot. In operation, the body is moved laterally by cylinder drivers 90 so that when the jaws are closed about the tubing, the tubing is then driven further onto the prong before shrink fitting.

Figure 9:
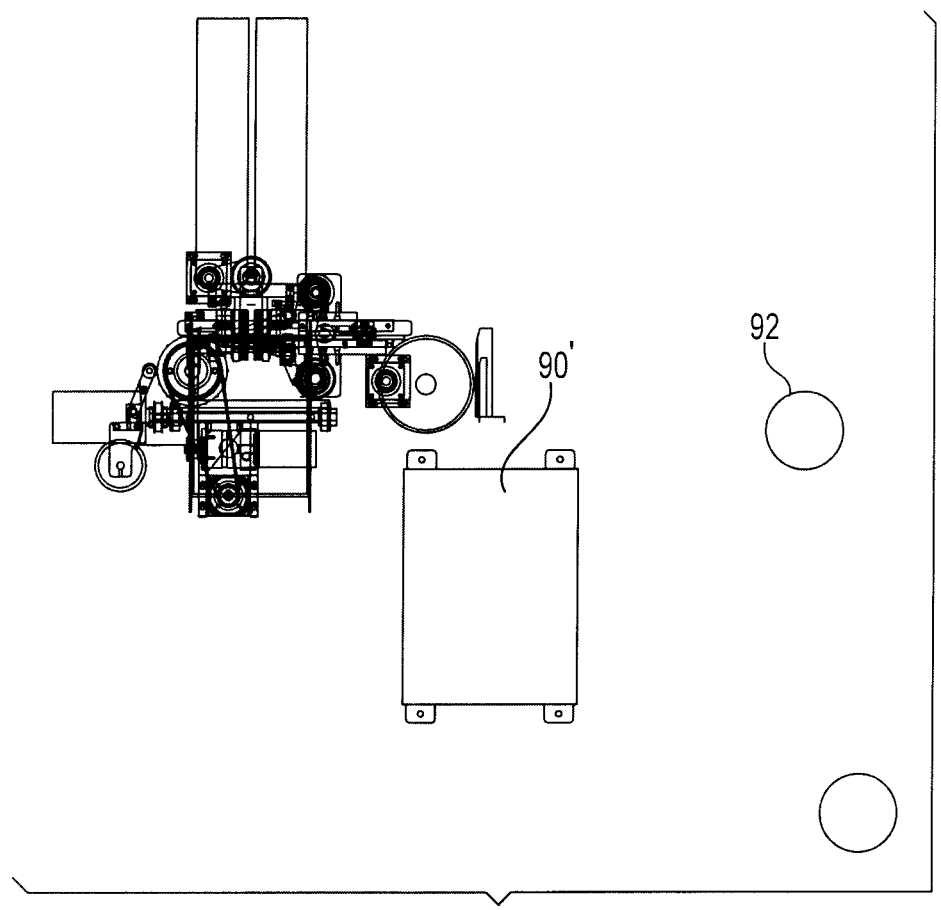
FIG. 9 is a top plan view of a sheath insertion machine.

FIG. 9 shows a heat channel 90' (90 prime) which provides a blast of heat to the heat shrinkable tubing 30 after being put on the tangs and then shrunk to a secure fit. A take up roll 92 collects the finished product onto a spool for slicing into individual units and applying the base material. Note that the tubing need not be shrunk only by heat. Other types of tubes which contract about the prong are possible, such as wet-to-dry shrinking typically of materials like cloth.

Final assembly onto base material 26 and then applying on to a file folder can be done by methods well known in the art of clasps not having this protective sheath.

Divider Embodiment

The sheath solution is less preferred for the special configuration used where a folder has an internal divider section which also has a pronged clasped. Such a divider is shown at www.smead.com as item 68025.

Internal divider sections are located between two outer covers (often with pronged clasps). They are often called classification folders. While it is possible to use the sheath covered solution above, it is known to provide a clasp structure which straddles the top of the divider section as shown in FIGS. 17-18.

These differ from the claps shown in FIGS. 1-7 in that they are intended for divider boards which are inserted between front and back covers. As dividers, they have double sided clasps (four tangs per unit attached to the divider, one pair for each side of the divider board). Consequently, it is somewhat more difficult to use the sleeve solution in FIGS. 1-8 because the clasps are closer together, often the pairs of tangs are of different lengths and there is a bend that must be formed in the assembly for crimping to the board. The methods described herein are applicable, but must be adapted slightly to accommodate closer spacing between tangs and tangs of different length.

Figure 15:
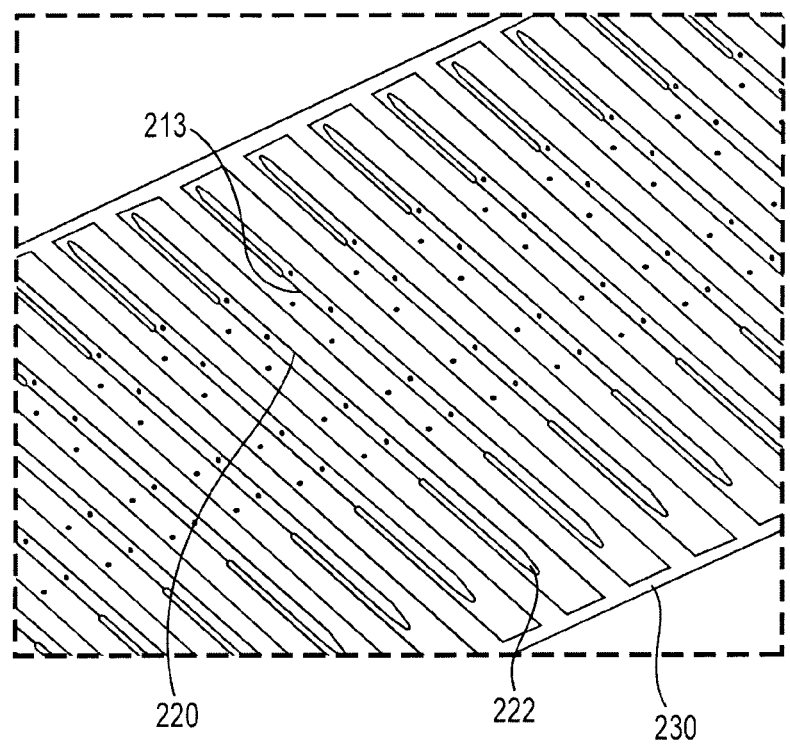
FIG. 15 is a perspective view of the plurality of divider style prong clasps in FIG. 8 illustrates.
Figure 16:
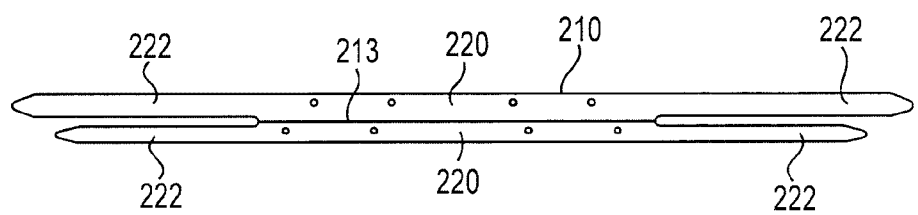
FIG. 16 is a top plan view of a single divider style prong clasp in FIG. 15.
Figure 17:
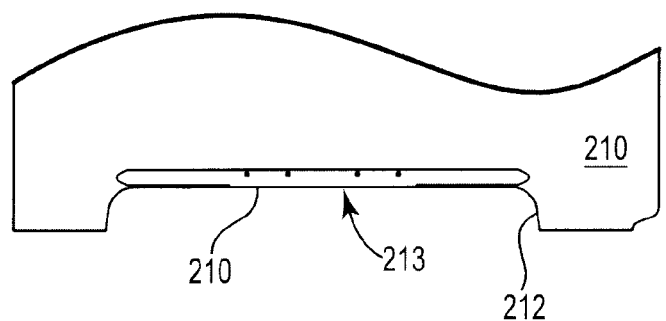
FIG. 17 a fragmentary plan view of a divider style prong clasp of FIG. 16 installed on one side of a divider.
Figure 18:
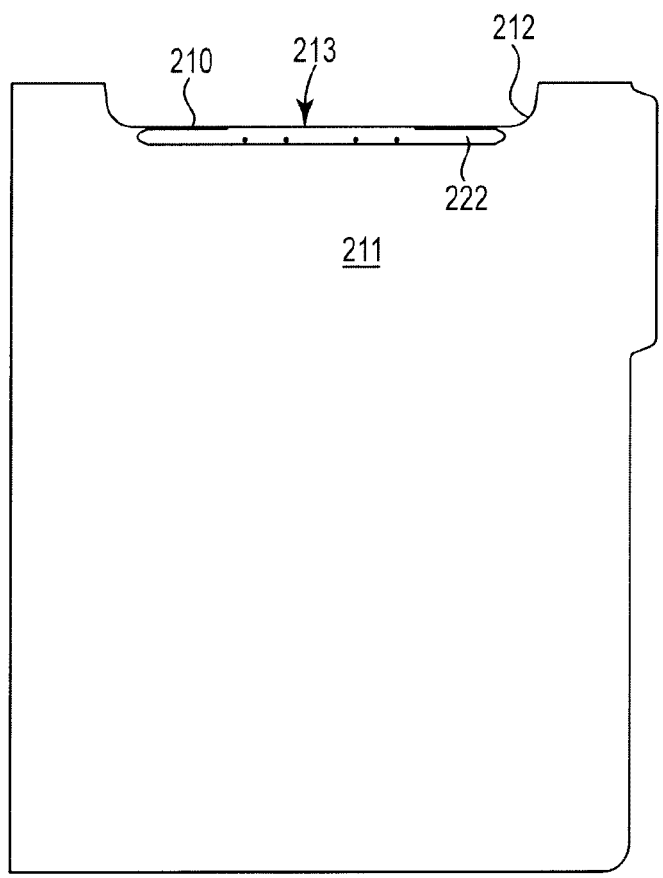
FIG. 18 is the other side of the divider shown in FIG. 17 shown in full view.

The divider 211 has two sides (FIG. 17 is a partial mirror image of FIG. 18). A recess is cut into the divider panel 211 such that the tangs 222 will be positioned appropriately for documents. Note: the clasp 210 straddles both sides of the divider by means of a link portion 213 between front and rear sides. FIGS. 15 and 16 also show these features.

FIG. 15 illustrates how a plurality of clasps 210 are chained together into a single spool.

In order to solve the problems of the prior art clasps as mentioned above, the framing connectors 230 (FIG. 15) needed to maintain the clasps on a roll. The connectors 230 will be cut out later.

The solution of the present invention in this embodiment is to overcoat the tangs and preferably the base section 220 with a protective coating which will remove all sharp edges and insure that the bending radius is increased, which will prevent kinking and metal fatigue.

The description of the invention and its applications as set forth herein is illustrative and is not intended to limit the scope of the invention. Variations and modifications of the embodiments disclosed herein are possible, and practical alternatives to and equivalents of the various elements of the embodiments would be understood to those of ordinary skill in the art upon study of this patent document. These and other variations and modifications of the embodiments disclosed herein may be made without departing from the scope and spirit of the invention.

The invention claimed is:

1. A machine for applying a heat shrinkable tubing on a generally planar paper fastener prong, comprising:
   a. tubing supply driver including first and second drive wheels each having a circumferential recess in their outer periphery, said drive wheels having their circumferential edges located adjacent each other, said recess together defining a space just smaller than the outer circumference of the tubing; said driver being actuatable to drive said tubing laterally onto said prong;
   b. a pusher for further sliding the tubing into a final position on the prong; said pusher including first and second opposing jaws, at least one of said jaws including a pivotal arm; and
   c. a reciprocating arm and lateral driver attached to a link and capable of sequentially moving the jaws between open and closed positions and then further moving the jaws laterally, thereby driving, through said link, the jaws between open and closed positions and then laterally toward said prong, wherein, in said closed position, said jaws engage said tubing to drive it onto said prong.

2. The machine of claim 1, wherein said opposing jaws are generally planar and include a plurality of teeth to engage said tubing.

3. The machine of claim 1, wherein said machine is adapted to act on a prong which is tapered from a base to a distal free end.

4. An apparatus for applying a shrinkable tube to a plurality of spaced apart generally planar prong elements, comprising:
   a. first and second opposing jaw members having inner opposing faces each having gripping portions thereon;
   b. at least one of said members having a pivot distant from said gripping portions;
   c. a three point link pivotally connected to said pivot at one point, to a stationary member at a second point and to a reciprocating driver at a third point;
   d. said reciprocating driver capable of imparting movement into said link and thereby to said gripping portions via said link to bring said jaw members together thereby sufficiently engaging a tube disposed on a generally planar prong; and
   e. a lateral driver connected to said link and actuated when said jaw members engage said tube, to further drive the jaw members laterally and push the engaged tube along the prong.

5. The apparatus of claim 4 wherein said link is a chain link pivotally connected at one end to the reciprocating driver.

6. The apparatus of claim 4 wherein said lateral driver is connected to a mount upon which also includes the link and jaws, so that when the lateral driver moves, the link and the jaws are likewise moved.

7. The apparatus of claim 4 further including a pair of pinch rollers sized to snugly receive a length of said tubing and drive it on to the prong.

8. The apparatus of claim 7 wherein said pinch rollers include a pair of rollers contacting on their peripheral edge and wherein their peripheral edge includes a recess to receive said tubing.

* * * * *